(12) United States Patent
Parmar et al.

(10) Patent No.: US 9,350,735 B1
(45) Date of Patent: May 24, 2016

(54) CONTEXT-BASED DYNAMIC INFORMATION RIGHTS MANAGEMENT

(71) Applicant: EMC Corporation, Hopkinton, MA (US)

(72) Inventors: Varun Parmar, San Jose, CA (US); Ondrej Hrebicek, San Carlos, CA (US); Matthew Doermann, Palo Alto, CA (US); Gopinath Sundharam, Fremont, CA (US); Christopher A. Hebert, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 67 days.

(21) Appl. No.: 14/144,892

(22) Filed: Dec. 31, 2013

(51) Int. Cl.
*H04L 29/06* (2006.01)
*G06F 21/10* (2013.01)
*G06F 21/12* (2013.01)

(52) U.S. Cl.
CPC ............. *H04L 63/10* (2013.01); *G06F 21/10* (2013.01); *G06F 21/121* (2013.01)

(58) Field of Classification Search
CPC ........ H04L 63/10; G06F 21/10; G06F 21/121
See application file for complete search history.

(56) References Cited

U.S. PATENT DOCUMENTS

| | | | | |
|---|---|---|---|---|
| 2004/0024670 | A1* | 2/2004 | Valenzuela | G06F 21/10 705/35 |
| 2005/0086503 | A1* | 4/2005 | Ranner | G11B 19/04 713/193 |
| 2006/0041751 | A1* | 2/2006 | Rogers | H04L 29/06 713/171 |
| 2007/0067851 | A1* | 3/2007 | Fernando | G06F 21/10 726/26 |
| 2008/0172678 | A1* | 7/2008 | Lee | G06F 21/10 719/315 |
| 2009/0292930 | A1* | 11/2009 | Marano | G06F 21/6218 713/189 |
| 2009/0319529 | A1* | 12/2009 | Bartlett et al. | 707/9 |
| 2010/0031366 | A1* | 2/2010 | Knight | G06Q 10/10 726/26 |
| 2012/0136749 | A1* | 5/2012 | Hu et al. | 705/26.5 |
| 2012/0246472 | A1* | 9/2012 | Berengoltz | G06F 11/1448 713/165 |
| 2013/0054970 | A1* | 2/2013 | Cheng et al. | 713/171 |
| 2013/0227712 | A1* | 8/2013 | Salem | G06F 21/6218 726/30 |
| 2014/0059701 | A1* | 2/2014 | Lim | G06F 21/60 726/27 |
| 2014/0380048 | A1* | 12/2014 | He | H04L 63/083 713/168 |
| 2015/0149774 | A1* | 5/2015 | Taima | H04L 63/0428 713/168 |
| 2015/0281279 | A1* | 10/2015 | Smith | H04L 63/20 726/1 |

FOREIGN PATENT DOCUMENTS

WO  WO 2011006282 A1 *  1/2011

* cited by examiner

*Primary Examiner* — Hadi Armouche
*Assistant Examiner* — Sher A Khan
(74) *Attorney, Agent, or Firm* — Dergosits & Noah LLP; Todd A. Noah (57) ABSTRACT

Disclosed are systems and methods for context-based dynamic information rights management (IRM) in a cloud-based document management environment. A system may include a document server configured to store a plurality of documents. The document server is coupled to an information rights server and a plurality of client computer systems via a network. One or more of the document server and the information rights server may be cloud-based. The information rights for a document stored in the document server may be determined by the information rights server based on context parameters associated with a request to download the document from the document server.

15 Claims, 10 Drawing Sheets

CONTEXT-BASED DYNAMIC INFORMATION RIGHTS MANAGEMENT

BACKGROUND

The present invention relates to the field of information technology, including, more particularly, to systems and techniques for information rights management.

The rights to access documents are generally determined by the document creators. Once the rights are determined, the document may be shared with intended recipients. One disadvantage of this approach is that all of the recipients are subjected to the same access rights, even though they may have different needs or be in different situation.

DETAILED DESCRIPTION

A context-based dynamic information rights management (IRM) system may include a document server configured to store a plurality of documents. In some of the embodiments described herein, the systems and methods for context-based dynamic information rights management (IRM) are implemented in a cloud-based document management environment. The document server may be coupled to an information rights server and a plurality of client computer systems via a network. One or more of the document server and the information rights server may be cloud-based. The information rights for a document stored in the document server may be determined by the information rights server based on context parameters relating to the context of a request to download the document from the document server.

Figure 1:
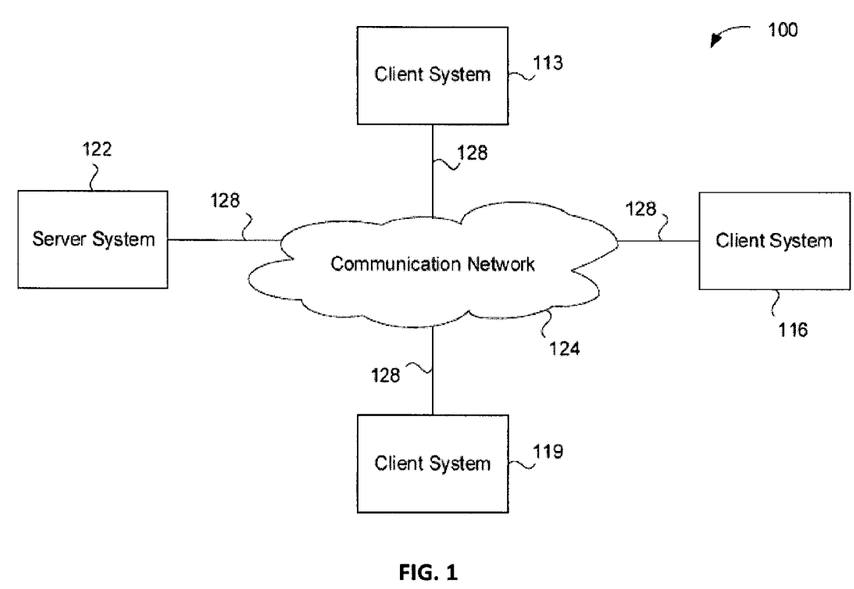
FIG. 1 shows a block diagram of a client-server system and network, implemented in accordance with an exemplary embodiment.

Prior to describing the subject matter in detail, an exemplary computer network in which the subject matter may be implemented shall first be described. Those of ordinary skill in the art will appreciate that the elements illustrated in FIG. 1 may vary depending on the system implementation. With reference to FIG. 1, a simplified block diagram of a distributed computer network 100 is shown. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client and a server depending on whether the computer system is requesting or providing information. Additionally, although aspects of the invention have been described using a client-server environment, it should be apparent that the invention may also be embodied in a stand-alone computer system. Aspects of the invention may be embodied using a client-server environment or a cloud-computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer® browser program provided by Microsoft® Corporation, and the Firefox® browser provided by Mozilla® Foundation, and others.

Figure 2:
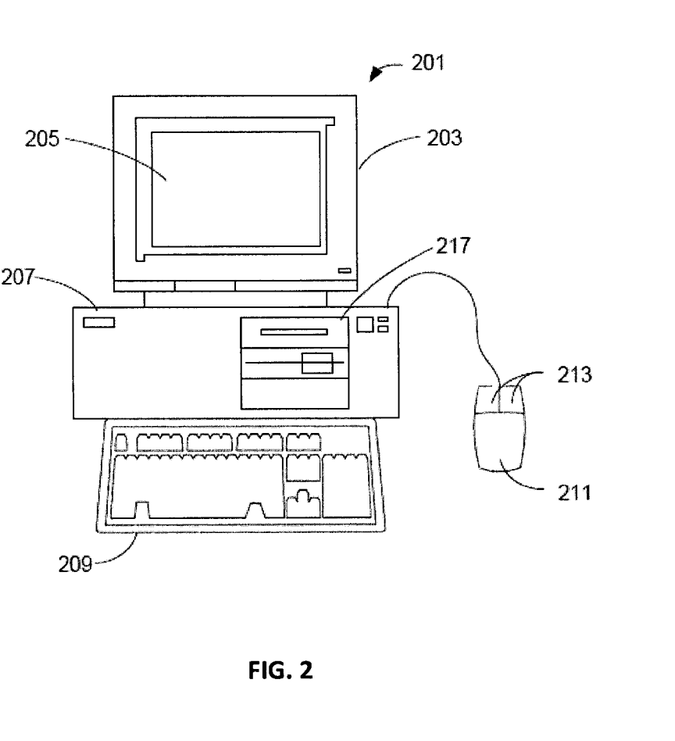
FIG. 2 shows a more detailed diagram of an exemplary client or computer, implemented in accordance with an exemplary embodiment.

FIG. 2 shows an exemplary client or server system. In an embodiment, a user interfaces with the system through a computer workstation system, such as shown in FIG. 2. While FIG. 2 illustrates a computer workstation, the user can interface with the system through a mobile device such as a mobile phone, laptop computer or computer tablet. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc®), flash and other nonvolatile solid-state storage (e.g., USB flash drive), battery-backed-up volatile memory, tape storage, reader, and other similar media, and combinations of these.

A computer-implemented or computer-executable version of various implementations may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of software may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
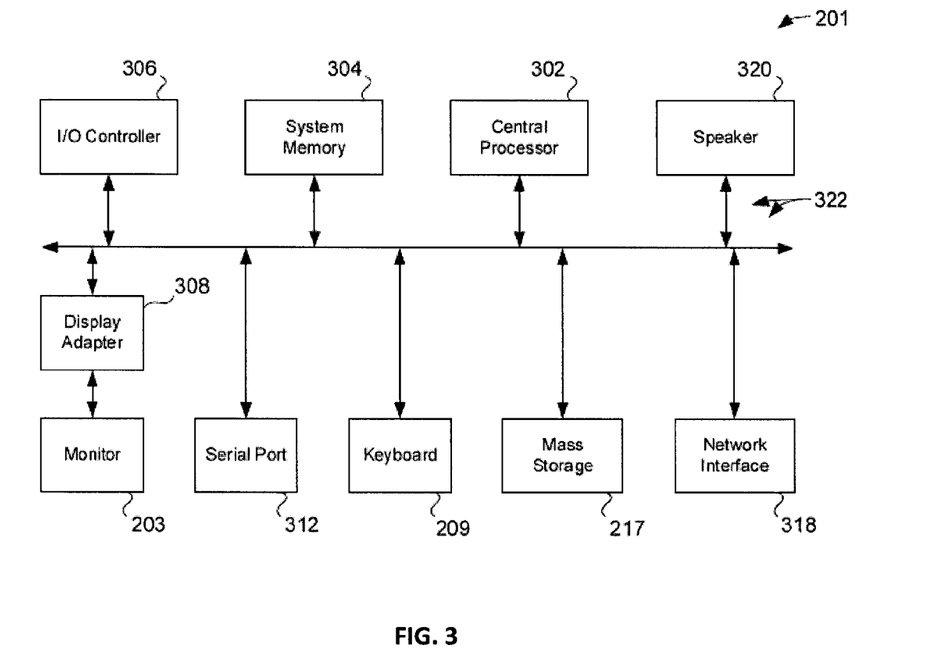
FIG. 3 shows a system block diagram of a client computer system, implemented in accordance with an exemplary embodiment.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab® (from MathWorks), SAS, SPSS, JavaScript®, AJAX, Java®, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans® (from Oracle Corporation) or Enterprise Java Beans® (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows 95®, 98, Me, Windows NT®, Windows 2000®, Windows XP®, Windows XP® x64 Edition, Windows Vista®, Windows 7®, Windows CE®, Windows Mobile®), Linux, HP-UX, UNIX, Sun OS®, Solaris®, Mac OS X®, Alpha OS®, AIX, IRIX32, or IRIX64. Other operating systems may be used. Microsoft Windows® is a trademark of Microsoft® Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
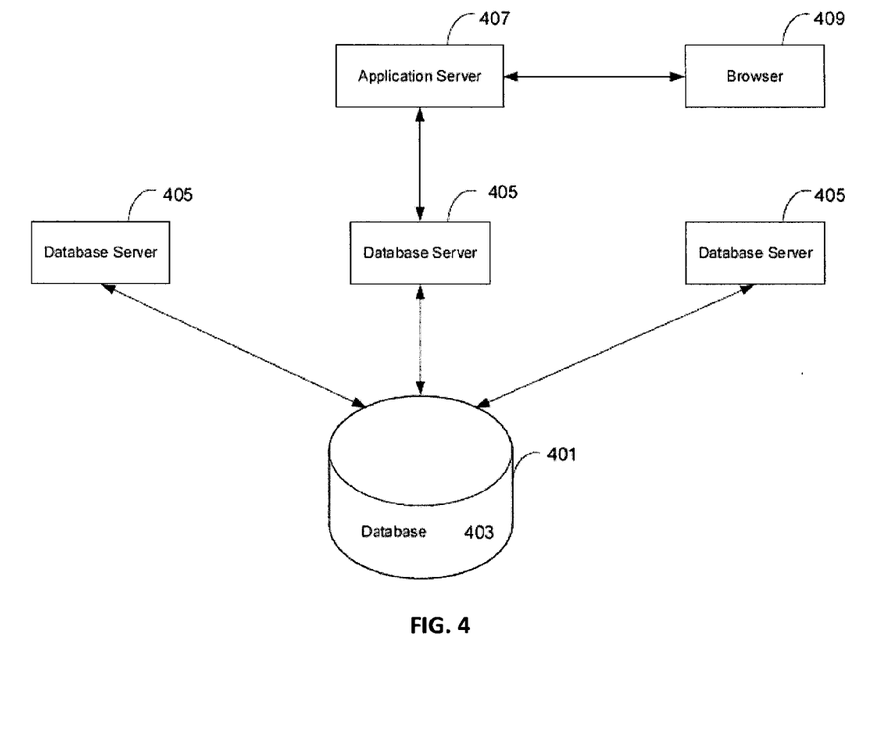
FIG. 4 shows a data source or data service in the form of a database system, implemented in accordance with an exemplary embodiment.

FIG. 4 shows a data source or data service in the form of a database system. A database may be part of a database management system. One suitable database-management-system architecture is a three-tiered architecture as shown.

In a first tier is the core of a database management system, a central storage 401 that holds or stores a database or repository 403. The database typically resides on one or more hard drives, and is generally part of a larger computer system. The information may be stored in the database in a variety of formats. An example is an Extensible Markup Language (XML) database. An XML database is a data persistence software system that allows data to be stored in XML format. Another example is a relational database management system (RDMS) which uses tables to store the information.

In a second tier are database servers 405. The database servers are instances of a program that interacts with the database. Each instance of a database server may, among other features, independently query the database and store information in the database. Depending on the implementation, the database servers 405 may or may not include user-friendly interfaces, such as graphical user interfaces.

In a third tier is an application server 407. There may be multiple application servers. In an implementation, the application server provides the user interfaces to the database servers. By way of example, the application server may be a web application server on the Internet or any other network. The application server may also be a virtual database server or a virtual directory server. The application server may provide user-friendly mechanisms and interfaces for accessing the database through the database servers. In an implementation, a web browser 409 is utilized to access the application server.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Figure 5:
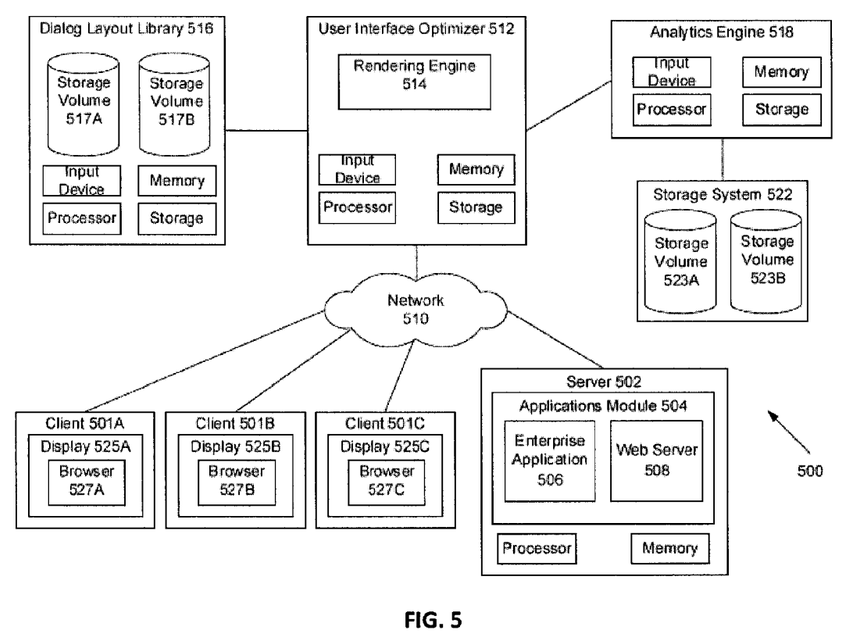
FIG. 5 shows a block diagram of an example of a system 500 for selecting a dialog layout, implemented in accordance with an exemplary embodiment.

FIG. 5 shows a block diagram of an example of a system 500 for selecting a dialog layout, implemented in accordance with some implementations. In various implementations, system 500 may handle a request to optimize a dialog layout of a software application, such as an enterprise application. In some implementations, system 500 may include server 502, applications module 504, enterprise application 506, web server 508, network 510, user interface optimizer 512, rendering engine 514, dialog library 516, storage volume 517A, storage volume 517B, analytics engine 518, storage device 522, storage volume 523A, and storage volume 523B. Moreover, system 500 may include any number of clients such as first, second, and third clients 501A, 501B, and 501C which access server 502 via network 510.

The clients are general purpose computers with hardware and software, such as shown in FIGS. 1 and 3 described above. For example, the first client includes a first display 525A, a first application program (e.g., first browser program) 527A, an input device, a processor, memory, and storage. Similarly, the second client includes a second display 525B, a second application program (e.g., second browser program) 527B, an input device, a processor, memory, and storage. The third client includes a third display 525C, a third application program (e.g., third browser program) 527C, an input device, a processor, memory, and storage.

FIG. 5 shows three clients. It should be appreciated that an enterprise can have any number of clients such as tens, hundreds, or thousands of clients. The clients execute executable code (or computer-readable code) that embodies a technique or algorithm as described in this application. The browser is an application program that can request, receive, and process data from a user, the server, or both. The data can be shown via a display. While FIG. 5 illustrates the data being displayed on a client machine, the data can also be displayed on a mobile device such as a mobile phone, laptop computer or computer tablet.

In various implementations, system 500 may include server 502. The server includes components similar to the components described in FIGS. 1 and 4. In some implementations, server 502 may include hardware and software used to run one or more services to serve the needs of other computers and users on network 510. Thus, server 502 may include one or more processors and memory capable of executing software operations and serving webpages. It will be appreciated that in some implementations, server 502 may comprise several servers in a distributed or cloud computing network.

In various implementations, server 502 may include an applications module, such as applications module 504. In some implementations, applications module 504 includes software and hardware that may be used to execute one or more software applications. Thus, applications module may include software and/or firmware instructions that configure the functionality of server 502.

According to various implementations, applications module 504 includes enterprise application 506. In particular implementations, enterprise application 506 may include software instructions that, when executed by one or more processors, execute one or more processes associated with an enterprise application. Thus, enterprise application 506 may include software instructions that configure one or more tasks performed by a user when the user is performing a process of the enterprise application.

In various implementations, applications module 504 may include an application used to serve webpages, such as web server 508. In some implementations, web server 508 serves web pages to a client machine operated by a user of the enterprise application. Thus, according to various implementations, an application such as a web server 508 may deliver webpages and other content from a storage volume of server 502 to the browsers of the client machines. Thus, according to various implementations, an enterprise application may be accessible to a client machine over the network using the browser. For example, first, second, and third users at client computer systems 501A-501C, respectively, login by using a browser to access the application. The application may require that the user input a username and a password so that the user can be authenticated. The users may be employees, colleagues, partners, or members of the same company, organization, entity, partnership, joint venture, or have a business relationship (e.g., supplier-manufacturer relationship, or client-vendor relationship), and so forth.

In various implementations, system 500 may include user interface (UI) optimizer 512. In some implementations, UI optimizer 512 may be configured to handle requests to optimize a dialog layout for one or more dialogs in a process of an enterprise application. Thus, UI optimizer 512 may communicate with other entities, such as a client machine or server 502, via network 510 and receive a request to optimize a dialog layout. UI optimizer 512 may handle the request by communicating with other components of system 500 that may be coupled to a network, such as analytics engine 518 and dialog layout library 516. UI optimizer may return a result or response to the request via network 510.

In various implementations, UI optimizer 512 may include a rendering engine, such as rendering engine 514. In various implementations, rendering engine 514 may be configured to render a data object into a rendered data object capable of being displayed in a display device of a client machine. For example, rendering engine 514 may render an intermediate data structure into hypertext markup language (HTML) capable of being displayed by an web browser. Thus, according to various implementations, rendering engine 514 may be configured to render a dialog layout into a dialog that may be displayed in a web browser of a client machine, mobile phone, laptop computer or computer tablet.

In various implementations, system 500 may include dialog layout library 516. In some implementations, dialog layout library 516 may include one or more storage volumes, such as storage volume 517A and 517B. In particular implementations, dialog layout library 516 may be configured to store information associated with various dialog layouts, such as content that may be displayed in the dialog layouts. For example, dialog layout library 516 may store one or more data values identifying the content of a text box or the appearance and function of a control. Thus, dialog layout library 516 may provide a repository for information and content associated with various different dialog layouts that may be used at various different stages of the methods described herein.

In various implementations, system 500 may include analytics engine 518. In some implementations, analytics engine 518 may be configured to dynamically analyze responses from users of the enterprise application and select one or more dialog layouts to be provided to the users. Thus, analytics engine 518 may be configured to track input received from users and other components of system 500, and may be further configured to make one or more decisions based on that tracked information.

In various implementations, analytics engine 518 may be configured to store data and metadata related to decisions that have been made, and data that was used to make them. Thus, according to some implementations, system 500 may include storage system 522, where storage system 522 may be coupled to analytics engine 518. In various implementations, storage system 522 may include one or more storage volumes, such as storage volume 523A and storage volume 523B. In particular implementations, storage system 522 may store information generated by analytics engine 518 and used by analytics engine 518. Thus, one or more data values identifying decisions made by and metrics measured by analytics engine 518 may be stored in storage system 522.

Figure 6:
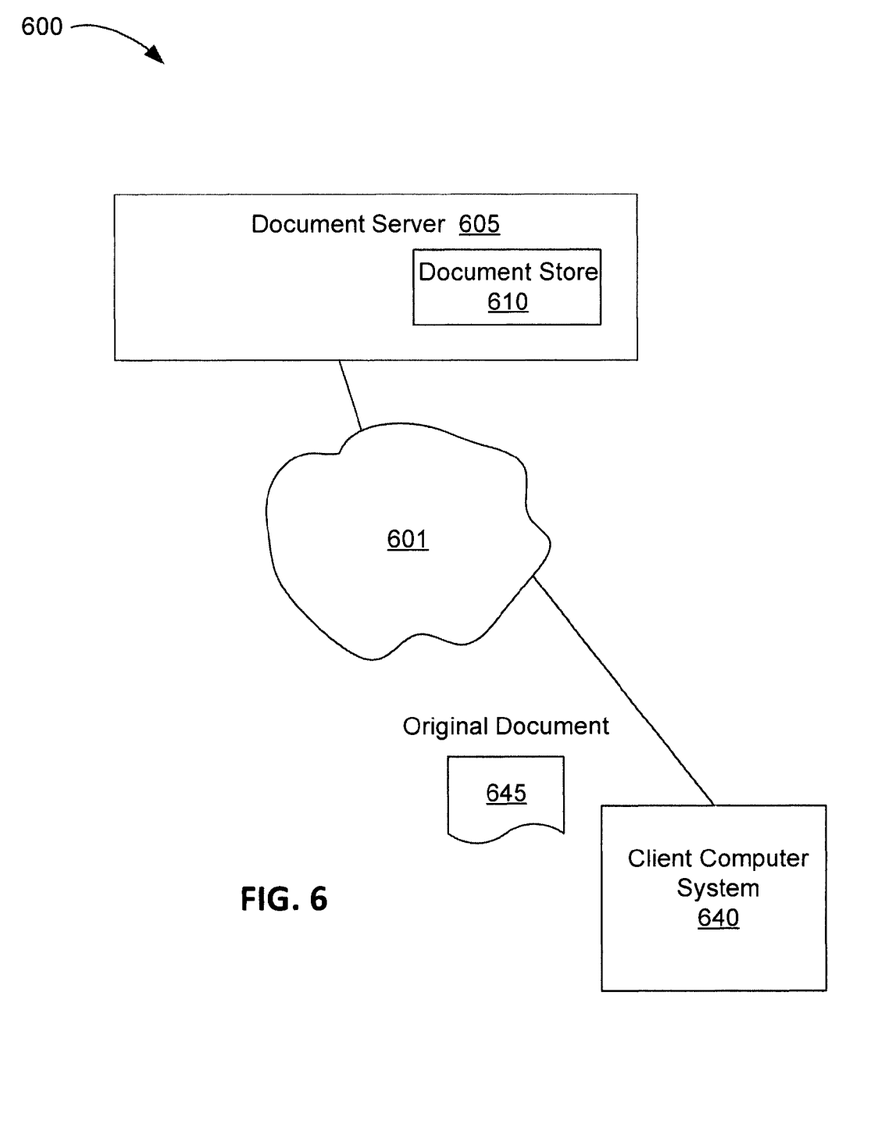
FIG. 6 shows a block diagram that illustrates an example system 600 that may be used to determine whether to encrypt documents, in accordance with an exemplary embodiment.

FIG. 6 shows a block diagram that illustrates an example system that may be used to determine whether to encrypt documents, in accordance with an exemplary embodiment. Diagram 600 includes a document server 605 and client computer system 640 coupled to a network 601. The network 601 may be the Internet. The document server 605 may be configured to store a document 645 (referred to as an original document) that may have been created and uploaded by a document creator using the client computer system 640. For some embodiments, the original document 645 may be uploaded as is and without being associated with any information rights (e.g., read, modify, delete, etc.)

The original document 645 may be stored in the document store 610 of the document server 605. For some embodiments, the document creator may indicate that the original document 645 can be shared with other users. It may be possible that the document creator may share some documents and may not share some other documents. For some embodiments, based on uploading the original document 645 to the document server 605, the document creator implicitly indicates that the original document 645 can be shared.

For some embodiments, when the original document 645 is to be shared, the document server 605 may analyze the original document 645 to determine whether the original document 645 should be encrypted. The analysis may be based on the content of the original document 645. Other factors may also be used including, for example, information about the creator of the original document 645, information about a group that the creator of the original document 645 belongs to, and so on. For example, when the content of the original document 645 is identified as a press release, the original document 645 may not need to be encrypted. However, when the original document 645 is determined to include sensitive information, it may need to be encrypted. The original document that is encrypted may be referred to as an encrypted document. A decryption key may be necessary to decrypt the encrypted document at a subsequent time.

Figure 7:
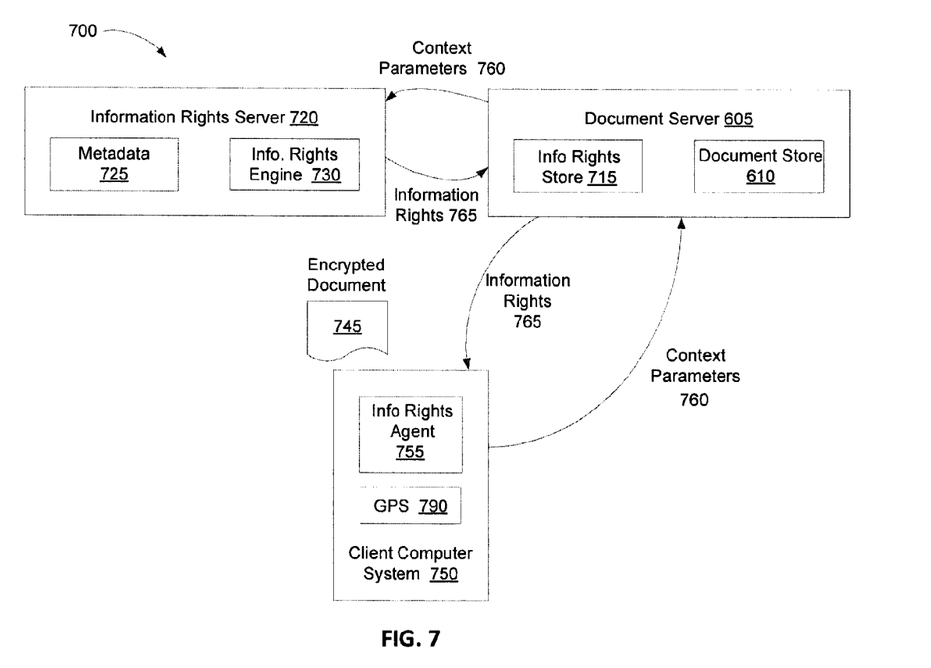
FIG. 7 shows a block diagram that illustrates an example system that may be used to determine information right for documents, in accordance with an exemplary embodiment.

FIG. 7 shows a block diagram that illustrates an example system that may be used to determine information rights for documents, in accordance with an exemplary embodiment. The information rights may indicate how the document can be accessed. For example, the information rights may include the right to open and view the document, the right to modify or update the document, the right to delete the document, etc.

Diagram 700 includes the document server 605 (illustrated in FIG. 6), an information rights server 720 and a client computer system 750, all coupled to a network such as the network 601 (illustrated in FIG. 6). The client computer system 750 may be used by a user to download the encrypted document 745 from the document server 605. The client computer system 750 may include features similar to the computer systems described in FIGS. 2 and 3. The connectivity of the client computer system 750, the document server 605 and the information rights server 720 may include features similar to the networks described in FIGS. 1, 4 and 5. The encrypted document 745 may be associated with the original document 645 (illustrated in FIG. 6). Although the document server 605 and the information rights server 720 are described here as two different servers, it may be possible that the functions and components of both servers may be combined into one server.

For some embodiments, the client computer system 750 may include logic configured to communicate context parameters 760 to the document server 605. The client computer system 750 may also include logic to receive or retrieve the information rights 765 associated with the encrypted document 745 from the document server 605. In the diagram 700, the module that performs this logic is referred to as an information rights agent 755.

The context parameters 760 may be associated with the context of the request to download the encrypted document 745 to the client computer system 750. The context parameters 760 may include information about the location (e.g., US or a foreign country, on-site or off-site, etc.) of the client computer system 750, the characteristics (e.g., mobile, laptop, etc.) of the client computer system 750, the document type of encrypted document 745, the time the request to download or open the encrypted document 745 is received, the number of requests to download or open documents received from the client computer system 750 within a certain time period, the network upon which the client computer system 750 is communicating, the history of access or download of documents or related folders from the client computer system 750, the user profile of the user using the client computer system 750, and other parameters.

For some embodiments, based on receiving the context parameters 760 from the client computer system 750, the document server 605 may modify the context parameters 760 to include additional information that may be useful to the information rights server 720. For example, the document server 605 may add the IP (Internet Protocol) address of the client computer system 750 to the context parameters 760 before sending the context parameters 760 to the information rights server 720.

The information rights server 720 may include metadata 725 and an information rights engine 730. The information rights server 720 may be configured to orchestrate generation of the information rights 765 and synchronize the downloading of the encrypted document 745 with the generation of the information rights 765. For some embodiments, the information rights server 720 is configured to use the context parameters 760 in conjunction with the metadata 725 and the information rights engine 730 to determine the information rights 765 for the encrypted document 745. The metadata 725 may be related to certain specific information rights. The information rights engine 730 may employ rules which may be based on adaptive approaches, administrative settings, intelligence, risk analysis, and other approaches. These rules are applied to the context parameters 760 to determine the appropriate information rights 765 for the encrypted document 745. For example, a rule may prevent the encrypted document 745 from being opened on a mobile device outside of the U.S. Thus if the context parameters 760 include information that indicate that the client computer system 750 is a mobile device and that the client computer system 750 is located in Europe, the information rights 765 may prevent the encrypted document 745 from being opened. However, if the client computer system 750 is a laptop or it is located in the US, then the information rights 765 may allow the encrypted document 745 to be opened.

The context parameters 760 may be adaptive. For example, if the context parameters 760 indicate that a user has not attempted to access a folder associated with the encrypted document 745 for twelve (12) months but is now attempting to open five (5) encrypted documents from the folder within a short period of time, a trigger may be activated to prevent what may possibly be an unauthorized access. As a result, the information rights 765 may be limited to, for example, no access or read only access to the folder. A notification may be sent to a network administrator to perform necessary action (e.g., limit the user from being able to initiate similar requests). The information rights 765 may then be sent by the information rights server 720 to the document server 605, and may be saved or persisted in the information rights store 715 of the document server 605.

For some embodiments, the determination of the information rights 765 may be performed by the information rights server 720 shortly after the document server 605 receives the request to download the encrypted document 745. Subsequent to receiving the information rights 765 from the information rights server 720, the document server 605 may send the encrypted document 745, the information rights 765 and a decryption key to the client computer system 750.

For some embodiments, the determination of the information rights 765 may be performed by the information rights server 720 based on the document server 605 receiving the request to open or access a previously downloaded encrypted document 745. If the information rights 765 from the information rights server 720 indicates that the user of the client computer system 750 can access the encrypted document 745, the document server 605 may send the decryption key to the client computer system 750. The information rights agent 755 may then use the decryption key to decrypt the encrypted document 745 and allow the user to open the previously encrypted document 745 in accordance with the information rights 765.

For some embodiments, the information rights 765 may remain valid for a limited period of time (e.g., seven days). For some embodiments, the information rights 765 may be stored in the information rights store 715 for re-use without using the service of the information rights server 720. The re-use of the information rights 765 may be possible if there is no change to the context parameters 760. However, if the context parameters 760 sent from the client computer system 750 at time t1 is different from the context parameters sent at time t2, then it may be necessary for the information rights server 720 to generate updated information rights. For example, when the user of the client computer system 750 moves from a first location at time t1 to a second location at time t2, the context parameters 760 may be different because the IP addresses may be different.

For some embodiments, when the encrypted document 745 is deleted from the document store 610, the information rights 765 associated with the encrypted document 745 may remain stored in the information rights store 715 for a certain period of time. This may enable a user who downloaded and stored the previously encrypted document 745 in the client computer system 750 to open it.

For some embodiments, the information rights agent 755 may be configured to determine the information rights locally instead of having to receive the information rights 765 from the document server 605 as described above. In this situation, the document server 605 may be configured to send to the client computer system 750 the rules to apply to the context parameters 760. The rules may be similar to or a subset of the rules applied by the information rights engine 730 of the information rights server 720. For some embodiments, the rules may have been stored in the client computer system 750 as part of the installation of the information rights agent 755 in the client computer system 750. The document server 605 may also send the decryption key to the client computer system 750 for decryption.

The information rights agent 755 may apply the rules to the context parameters 760 to locally determine the information rights. This method enables the client computer system 750 to determine the information rights independently of the document server 605 and the information rights server 720 after the encrypted document 745 has been downloaded to the client computer system 750. This may be useful when there is no network connectivity to the document server 605. For example, the rules may forbid access when the client computer system 750 is located outside of the U.S. For some embodiments, the client computer system 750 may be equipped with a global positioning system (GPS) to enable it to determine the GPS parameters (or location information) of the client computer system 750 without having to connect to a network.

Figure 8:
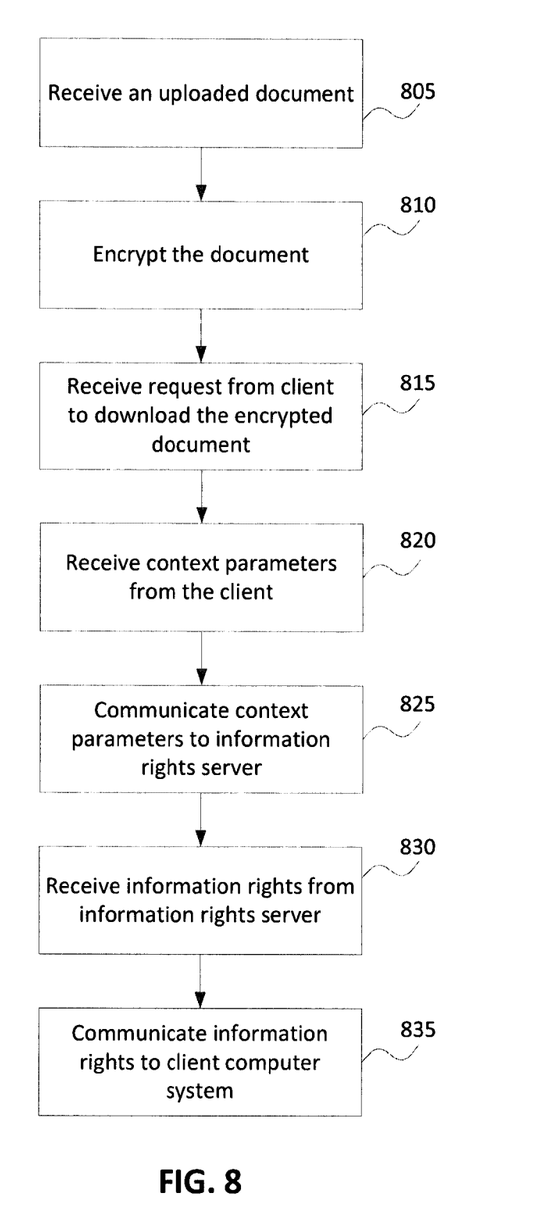
FIG. 8 shows a flow diagram that illustrates an example process that may be performed by a document server, in accordance with one exemplary embodiment.

FIG. 8 shows a flow diagram that illustrates an example process that may be performed by a document server, in accordance with one exemplary embodiment. The operations may be performed by the document server 605 illustrated in FIG. 7. The process may start at block 805 when an original document is uploaded to the document server. At block 810, assuming that the document includes sensitive information, it is encrypted.

At block 815, the document server may receive a request from a client computer system to download the document. At block 820, the document server may receive the context parameters associated with the request from the client computer system. It may be possible that the context parameters are sent with the request described in block 815.

At block 825, the document server may communicate the context parameters to the information rights server. The information rights server may apply rules to the context parameters to determine appropriate information rights. At block 830, the document server may receive the information rights from the information rights server. At block 835, the document server may communicate the information rights to the client computing system.

Figure 9:
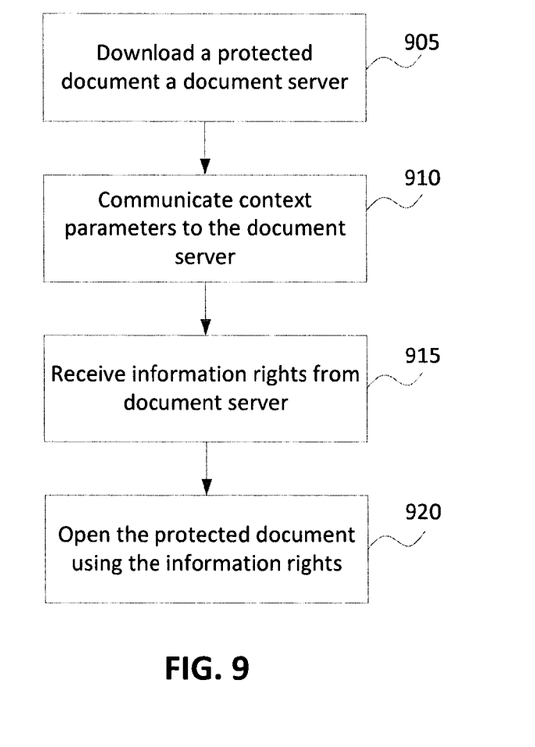
FIG. 9 shows a flow diagram that illustrates an example process that may be performed by a client computer system, in accordance with an exemplary embodiment.

FIG. 9 shows a flow diagram that illustrates an example process that may be performed by a client computer system, in accordance with an exemplary embodiment. The operations may be performed by the client computer system 750 illustrated in FIG. 7. The process may start at block 905 when a encrypted document is downloaded from the document server to the client computer system. The encrypted document is downloaded in response to a download request from the client computer system to the document server. At block 910, the client computer system communicates the context parameters to the document server. As described earlier, the context parameters may be based information associated with the client computer system, historical access information, information associated with the user of the client computer system, and others. The context parameters may be processed by the information rights server to determine the information rights, and the information rights may be sent from the information rights server to the document server.

At block 915, the client computer system receives the information rights from the document server. The client computer system may also receive a decryption key from the document server. It may be possible that the client computer system may communicate the context parameters to the document server prior to receiving the encrypted document. In this situation, the client computer system may subsequently receive the encrypted document, the decryption key and the information rights from the document server. At block 920, the client computer system may enable a user to open the encrypted document using the decryption key and the information rights. It may be noted that if the document (e.g., press release) requested by the client computer system is not an encrypted document, it may not be necessary for the client computer system to communicate the context parameters or to receive the decryption key and the information rights.

Since the context parameters may change depending on the environment of the client computer system 750, it may be possible that a user of the client computer system 750 is able to open the encrypted document 745 while in one country and not be able to open the same document while in another country. Similarly, it may be possible for the same user to be able to modify the encrypted document 745 while being on site and only be able to read the same document while offsite.

Figure 10:
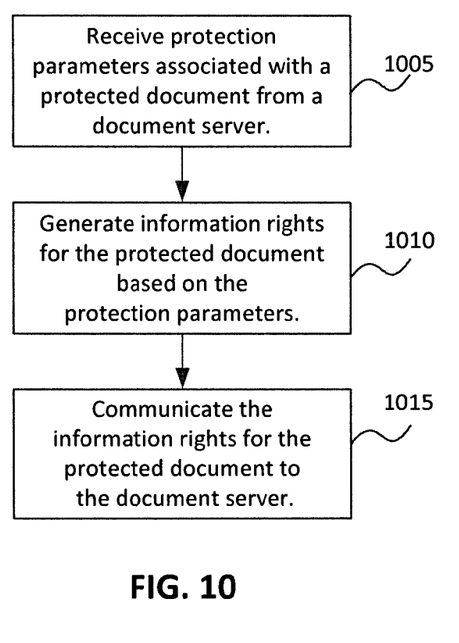
FIG. 10 shows a flow diagram that illustrates an example process that may be performed by an information right server, in accordance with an exemplary embodiment.

FIG. 10 shows a flow diagram that illustrates an example process that may be performed by an information rights server, in accordance with an exemplary embodiment. The operations may be performed by the information rights server 720 illustrated in FIG. 7. The process may start at block 1005 after the information rights server receives the context parameters from the document server. The context parameters may have originated from a client computer system and received by the document server. The context parameters may have been modified by the document server. For example, the document server may add the IP address information into the context parameters. At block 1010, the information rights server may generate the information rights by applying rules, policies and metadata to the context parameters. At block 1015, the information rights server may communicate the information rights to the document server.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A computer-implemented method, comprising:
receiving, at a server computer, a download request from a client computer system to download a document, the document not associated with any information rights, the request including context parameters associated with the download request, the context parameters including one or more of information associated with the client computer system, information associated with a document type of the document, information about a user initiating the download request, and information about historical activities of the user relative to the document;
sending, from the server computer, an encrypted version of the document to the client computer system based on receiving the download request and the context parameters;
generating, at the server computer, information rights by applying rules to the context parameters and storing the generated information rights in a document server; and
sending, from the server computer, the generated information rights for the document to the client computer system.

2. The method of claim 1, wherein the information rights are sent to the client computer system together with a decryption key.

3. The method of claim 2, wherein the information rights are generated and sent to the client computer system based on an attempt to open the encrypted version of the document at the client computer system.

4. The method of claim 2, wherein the information rights is generated and transmitted to the client computer system based on receiving the download request and the context parameters.

5. The method of claim 1, wherein the information rights are valid for a limited duration, and wherein the information rights include at least the right to read the document.

6. A system, comprising:
one or more hardware processors; and
a processor-based application stored on a non-transitory computer-readable medium, which when executed on a computer, will cause the one or more hardware processors to:
receive a download request from a client computer system to download a
document stored in a document server, the document not associated with any information rights, the request including context parameters associated with the download request, the context parameters including one or more of information associated with the client computer system, information associated with a document type of the document, information about a user initiating the download request, and information about historical activities of the user relative to the document;

send an encrypted version of the document to the client computer system based on receiving the download request and the context parameters;

generate information rights for the document requested by the client computer system and store the generated information rights in the document server, the information rights generated based on applying rules to context parameters associated with the download request; and send the generated information rights for the document to the client computer system.

7. The system of claim 6, wherein the processor-based application, when executed, will further cause the one or more processors to send a decryption key to the client computer system based on sending the information rights to the client computer system.

8. The system of claim 7, wherein the context parameters are sent to the processor-based application based on an attempt to open the encrypted version of the document at the client computer system, and wherein the information rights are sent to the client computer system based on the processor-based application receiving the context parameters.

9. The system of claim 7, wherein the context parameters are sent to the processor-based application based on the client computer system sending the download request, and wherein the information rights are sent to the client computer system with the encrypted version of the document.

10. The system of claim 7, wherein the context parameters are adaptive, and wherein the processor-based application is further configured to store the information rights for a limited time, and wherein the information rights includes at least right to read the document.

11. A computer program product, comprising a non-transitory computer-readable medium having a computer-readable program code embodied therein to be executed by one or more processors, the program code including instructions to:

receive a download request from a client computer system to download a document, the document not associated with any information rights, the request including context parameters associated with the download request, the context parameters including one or more of information associated with the client computer system, information associated with a document type of the document, information about a user initiating the download request, and information about historical activities of the user relative to the document;

send an encrypted version of the document to the client computer system based on receiving the download request and the context parameters;

generate information rights by applying rules to the context parameters and store the generated information rights in a document server; and send the generated information rights for the document to the client computer system.

12. The computer program product of claim 11, wherein the information rights are sent to the client computer system together with a decryption key.

13. The computer program product of claim 12, wherein the information rights are generated and sent to the client computer system based on an attempt to open the encrypted version of the document at the client computer system.

14. The computer program product of claim 12, wherein the information rights are generated and sent to the client computer system based on receiving the download request and the context parameters.

15. The computer program product of claim 11, wherein the information rights are valid for a limited duration, and wherein the information rights include at least the right to read the document.

* * * * *